United States Patent

Kotch

[15] 3,646,442

[45] Feb. 29, 1972

[54] DELTA MODULATION SYSTEM USING VARIABLE WEIGHTED QUANTA TO OVERCOME SLOPE LIMITATIONS

[72] Inventor: Robert Alan Kotch, Villa Park, Ill.

[73] Assignee: Bell Telephone Laboratories, Incorporated, Murray Hill, N.J.

[22] Filed: Apr. 30, 1970

[21] Appl. No.: 33,392

Related U.S. Application Data

[63] Continuation-in-part of Ser. No. 781,852, Dec. 6, 1968, abandoned.

[52] U.S. Cl. ........................325/38 B, 179/15 AV, 325/141, 332/11 D, 333/14

[51] Int. Cl. ........................H03k 13/22

[58] Field of Search ................325/38, 38 B, 141; 332/9, 11, 332/11 D; 333/14; 179/15 AV

[56] References Cited

UNITED STATES PATENTS

| | | | |
|---|---|---|---|
| 3,393,364 | 7/1968 | Fine | 325/38 |
| 3,500,205 | 3/1970 | Tudor-Owen | 325/38.1 |
| 3,249,870 | 5/1966 | Greefkes | 325/38 |
| 3,500,441 | 3/1970 | Brolin | 179/15 |
| 2,816,267 | 12/1957 | De Jager et al. | 332/11 |

*Primary Examiner*—Robert L. Griffin
*Assistant Examiner*—P. M. Pecori
*Attorney*—R. J. Guenther and James Warren Falk

[57] ABSTRACT

A delta modulation system is disclosed in which the input signal is compared with a reference level derived from the integrated output signal, the comparison resultant modulating a pulse train to produce the delta output signal in the conventional manner. The magnitude of the reference level is determined by superimposing the absolute magnitude of the integrator output on a fixed reference voltage level and utilizing the resultant voltage together with the sign of the integrator output to produce the reference level for the waveform reconstruction.

9 Claims, 6 Drawing Figures

INVENTOR
R. A. KOTCH
BY
J S Cubert
ATTORNEY

DELTA MODULATION SYSTEM USING VARIABLE WEIGHTED QUANTA TO OVERCOME SLOPE LIMITATIONS

This application is a continuation-in-part of application, Ser. No. 781,852 filed Dec. 6, 1968 now abandoned.

BACKGROUND OF THE INVENTION

This invention relates to pulse transmission systems and more particularly to improvements in such systems which employ delta modulation.

Among the many arrangements available for representing analog signals in digital form, delta modulation has the advantage of permitting the employment of the simplest coding and decoding circuitry. Generally speaking this practice requires quantization of changes in signal levels; i.e., the representation by one of two discrete values or quantum levels of the difference between a signal sample, which may have any amplitude in a continuous range, and a reference level determined by the previously transmitted signal sample.

In one simple form of delta modulation, the transmitted pulses are applied to identical integrating circuits at the transmitter and at the receiver. The integrator output at the transmitter provides a reference level which is compared with the original signal or input message wave at a rate which is determined by the sampling frequency. If the instantaneous amplitude of the input wave is higher than the integrator output reference level at the beginning of a sampling interval, a positive polarity output pulse is transmitted during the sampling interval. This output pulse, in turn, generates the quantum level that increases the integrator output to provide a higher reference level for the next sampling period. Contrarily, if the instantaneous amplitude of the input wave is lower than the integrator output reference level, no output pulse is transmitted, and the output reference level of the integrator decreases during the following sampling interval. The density of the resultant output pulse train thus corresponds to the slope of the input wave.

In a delta modulation system, amplitude quantization gives rise to deviations of the signal voltage reproduced at the receiver from the initial signal voltage supplied to the transmitter. Such deviations are referred to as quantizing noise and can be controlled by employing a high sampling frequency and/or a small amplitude quantum. If the amplitude quantum is a fixed value, this noise factor may become intolerable at low signal levels unless the amplitude quantum is also very small. However, overcoming small signal problems simply by employing a small fixed amplitude quantum may prevent the faithful tracking of the waveform throughout its dynamic range. This problem could be overcome only by an inordinate increase in the sampling frequency, i.e., an increase in the transmission bandwidth.

SUMMARY OF THE INVENTION

In accordance with my invention these problems are solved by the employment of a surprisingly simple arrangement which permits a meticulous construction and accurate reproduction of the transmitted signals as well as an appreciable reduction in quantization noise without requiring an increase in the sampling frequency. The transmitter comprises the conventional comparator and sampler, with the sampler output being integrated and applied to the comparator for comparison with the input message wave.

My invention allows the signal comparison reference level to vary with the input signal by reducing the dependence of the reference level on the inherent slope limitation of the integrator. This is accomplished by comparing the absolute magnitude of the integrator output with a fixed voltage and utilizing the superimposed value together with the sign of the sampler output to produce the reference level for signal comparison.

DRAWING

DETAILED DESCRIPTION

Figure 1:
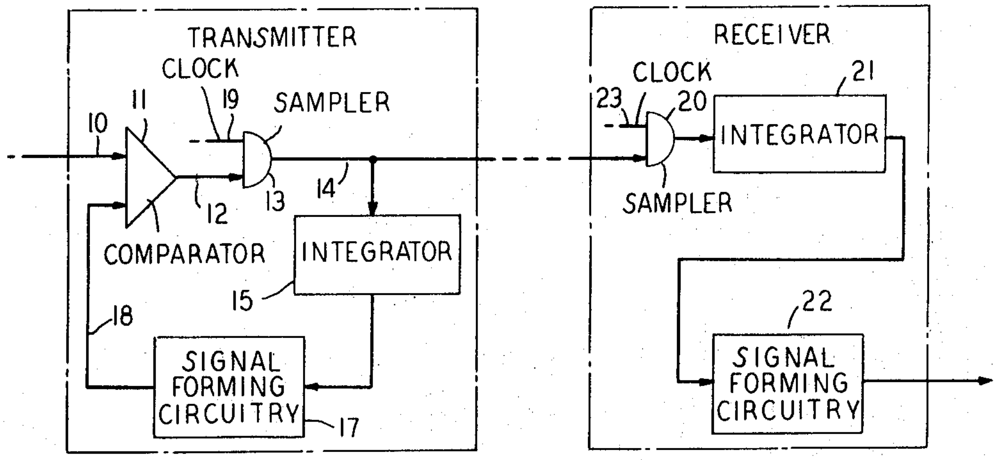
FIG. 1 is a block diagram of the transmitter and receiver of a delta modulation system in accordance with one illustrative embodiment of this invention.

In FIG. 1 there is shown a block diagram of an illustrative embodiment of the invention which effectuates the form of differential quantization of a signal known as delta modulation. The input signal on lead 10 at the transmitting station is first applied to a comparator or difference circuit 11 where it is compared with the output of signal forming circuit 17. The output of comparator 11 on lead 12 is applied to a sampler or pulse modulator 13 which provides a binary "1" pulse if the difference signal is positive and a binary "0" pulse if the difference signal is negative each time a clock pulse is received on lead 19. The "quantized" signal on lead 14 then is transmitted to integrator 15, the output of which is applied via signal forming circuitry 17 to comparator 11.

The output on conductor 14 of sampler 13 also is transmitted to the receiving station where it is sampled in sampler 20 and passed through an integrating circuit 21 and signal forming circuitry 22 to reproduce a replica of the original input signal. Sampler 20 is used to eliminate noise introduced in the transmission path between the transmitter and the receiver. Integrator 21 and signal forming circuitry 22 advantageously may comprise the same arrangement of elements as found in transmitter integrator 15 and signal forming circuitry 17 and described hereinafter with reference to FIG. 5.

This basic operation of a delta modulation transmitter, absent the weighting circuitry of signal forming circuit 17, is known in the prior art as shown, for example, in F. K. Bowers U.S. Pat. No. 2,817,061 issued Dec. 17, 1957. It results in a delta modulated output signal from sampler 13, as can readily be seen by referring to the waveforms in FIG. 2. For purposes of illustration consider a signal wave 26, having successive amplitudes at the respective sampling rate indicated at the bottom of FIG. 2. Whenever the voltage in sawtooth pattern 27, representing the output of integrator 15, is less than the voltage in curve 26 at the instant a clock pulse is applied to sampler 13, e.g., at point *a* in FIG. 2, a binary "1" pulse will be transmitted from sampler 13. This pulse is transmitted via conductor 14 to the associated receiver and is also applied to the input of integrator 15, so that the voltage at the output of integrator 15 will be increased by a predetermined amount to point *b*, FIG. 2.

During the interval between successive clock pulses, the voltage stored in integrator 15 is dissipated, such that upon receipt of the next clock pulse at sampler 13, the voltage in pattern 27 will be at point *c* which again is less than the voltage in curve 26. Therefore at this instant, comparator 11 again produces a positive output signal which will modulate the clock signal to produce a binary "1" output of sampler 13. This binary "1" signal again serves to increase the quantum level in integrator 15. This time, however, the voltage in pattern 27 will sustain a level *d* exceeding the voltage in curve 26 upon receipt of the next clock pulse. Under these conditions, comparator 11 will fail to provide an output signal. This, in turn, serves to block the output of sampler 13, resulting in transmission of a binary "0" signal to the associated receiver and a continued decline in the integrator output.

The process continues with the integrator output voltage varying about the input wave, depicted by curve 26, thereby producing an approximation of the input wave which can be utilized at the receiver to reproduce the original input wave simply by duplicating the sampling and integrating operations.

Figure 2:
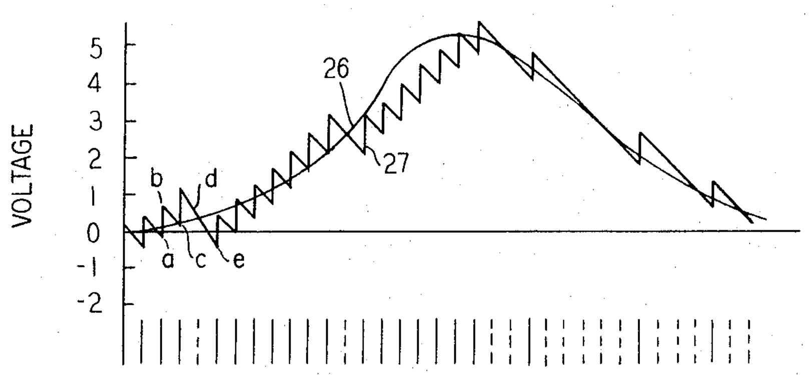
FIGS. 2, 3 and 4 are timing diagrams illustrative of the operation of the delta modulation system depicted in FIG. 1.

However, since each positive and negative pulse from the sampler alters the level of the signal on the integrating capacitor, a prolonged abrupt change in amplitude of the input signal, as indicated in FIG. 2, will produce a sequence of pulses of the same polarity from the sampler which will eventually overload the integrator and prevent its output from following the steep slope of the input signal; i.e., the operation is slope limited.

Thus it is significant in this instance to observe that the prior art arrangement employs a fixed quantum level such that despite the slope of the input wave, the integrator output voltage will always rise or fall by the same amount, as determined by the fixed quantum level. So long as the input wave has an appreciable amplitude, the sampling frequency, as depicted by the sampler output signals at the bottom of FIG. 2, is sufficient to provide a pattern which will permit a fairly close approximation of the original input wave except for the aforementioned overload condition. However, when the input wave is of very low amplitude, as depicted in FIG. 3, a fixed quantum level will produce a voltage pattern at the same sampling frequency which cannot follow the original input wave with sufficient accuracy to permit a satisfactory reproduction of the input wave at the associated receiver.

Figure 3:
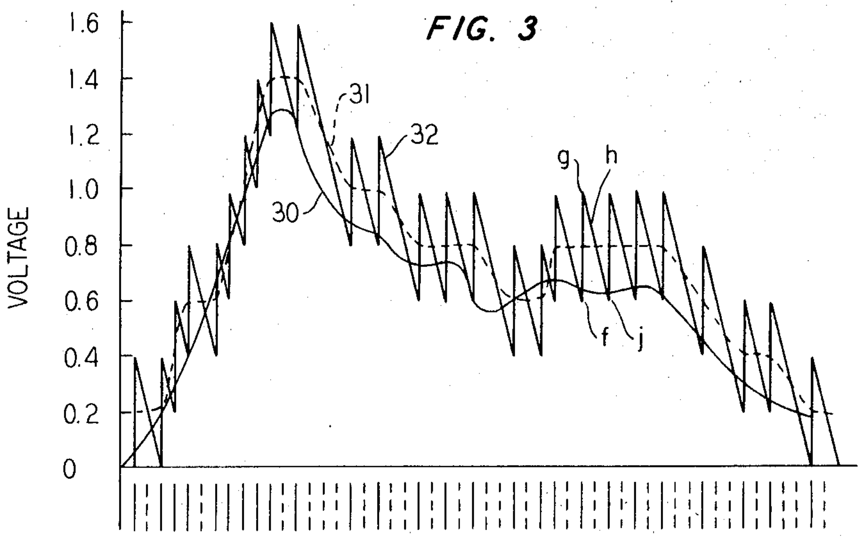

Thus input wave 30 in FIG. 3 differs in amplitude from curve 26 illustrated in FIG. 2. In this instance the amplitude of the signal voltage is substantially smaller, e.g., a factor of 10 smaller than the voltage in curve 26, the voltage in curve 30 being in a 0.1 volt scale, while that in FIG. 2 is indicated in a 1 volt scale.

It is apparent from consideration of FIG. 3 that an accurate construction of the input voltage is not transmitted below a given threshold value. The curve 31 shown in broken lines in FIG. 3 illustrates the low frequency component of the integrated voltage pattern 32, which obviously constitutes a very coarse approximation of the input wave. Moreover, with speech voltages of low amplitude, the quantization noise is particularly disturbing since, in its absolute value, this noise is a constant which is independent of the input voltage. This indicates that the ratio between the input voltage and the quantization noise decreases toward the low amplitude input voltages.

The three effects, which are particularly disturbing with low input signal amplitude, i.e., inaccurate reproduction, a decreasing ratio of input voltage to quantization noise at lower speech amplitudes and the danger of overloading the system, are obviated in accordance with this embodiment of my invention. As indicated in FIG. 1, a feedback loop contains signal forming circuitry 17 which modifies the output of integrator 15 in a unique manner and applies the resultant modified signal to one input of comparator 11 via lead 18. In this instance the binary output "1" or "0" of sampler 13 on lead 14 provides a discrete quantum level which is integrated in integrator 15. The absolute magnitude of the charge on the integrating capacitor after sampling has occurred, then is applied, together with the sign of the sampler output signal, to the signal on lead 18 going to the comparator. In this fashion large amplitude input signals on lead 10 will produce proportionately large voltage steps on lead 18 and vice versa, thus permitting a more faithful tracking of input signals at all levels including the extremely low levels.

Figure 4:
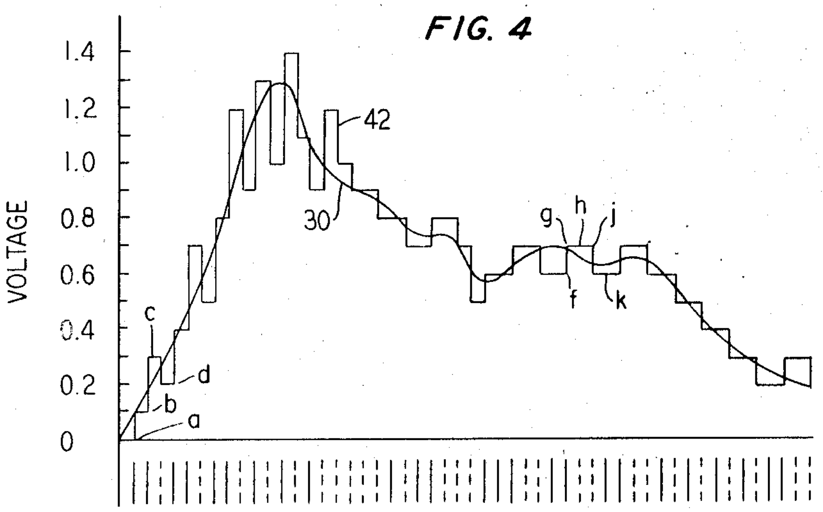

The results may be appreciated by reference to FIG. 3 in which the effect of low level input signals on the delta modulation transmitter utilizing a fixed quantum level, FIG. 3, is compared with the effect of the same input signals on a transmitter in accordance with this embodiment of my invention, FIG. 4. Thus as noted hereinbefore, a fixed quantum level results in the broken line output wave 31 in FIG. 3. In this instance, the quantum spans 0.4 volts so that signal voltages within this range cannot be registered accurately. However any smaller quantum value would merely exaggerate the error in larger magnitude signals. Observe, for example, the situation at point *f* where a comparison indicates that the voltage in the integrator output pattern 32 is less than the voltage in the input wave 30. A sampler output pulse thus triggers the integrator to produce an instantaneous increase in its magnitude to point *g* from which it declines over the balance of the sampling interval so as to reside at point *h* at the outset of the next sampling interval. Since point *h* is considerably above the instantaneous amplitude of the input wave 30, the comparator will fail at this time to produce a sampler output, and the integrator output pattern will continue to show a decline during the ensuing sampling interval. Thus at point *j*, which occurs at the outset of the next succeeding sampling interval, the integrator output voltage is once again less than the voltage in the sampling wave at that time so that another complete quantum gain is realized.

This process will continue without a change in output wave 31 until the amplitude of input wave 30 increases more than 0.2 volt or one-half the quantum voltage value. It is apparent, therefore, that no change in amplitude in the input wave can be registered so long as the wave falls within the range of one-half the fixed quantum value.

The advantage in utilizing the absolute value of the integrator output signal, in accordance with the illustrative embodiment of my invention, now becomes apparent. Thus, referring to FIG. 4, the identical input wave 30 is reproduced. In this instance the selected quantum level may be much smaller than the 0.4 volt utilized in the FIG. 3 arrangement, since the variable absolute magnitude of the integrator output follows steep or shallow slopes with equal facility. Thus, for purposes of illustration, a value of 0.1 volt is chosen for the quantum level. Also the bias voltage on the integrator is omitted from this discussion except for the fact that the absolute magnitude of the integrator output is determined in signal forming circuitry 17 with the bias voltage as the base level. In addition, for ease of description, the integrator is arranged so as to lock in the stored charge between sampling pulses.

Signal forming circuitry 17 also includes an arrangement for storing its output voltage between sampling pulses. I have found that this may be done by means of the output capacitance present at the junction of signal forming circuitry 17 and lead 18. Where this capacitance is sufficiently high, the signal at the junction is maintained between sampling pulses and is changed only by the output of signal forming circuitry 17 in response to the operation of integrator 15. If the capacitance present at the junction is not sufficient, a store circuit may be included in signal forming circuitry 17 to maintain the signal level on lead 18 constant between sampling pulses. The capacitance at said junction on the storing circuit operates to integrate the output of signal forming circuitry 17.

The signal forming circuitry output 42, depicted in FIG. 4, reflects this situation by maintaining the same signal level between successive sampling pulses, which pulses are indicated at the bottom of the figure as a solid line for a positive sample and a dotted line for a negative sample, i.e., the absence of a positive sample.

Considering first the situation on the steep slope in FIG. 4, at point *a* the absolute magnitude of the charge on the integrator is at the bias level, i.e., 0 volts in this illustration, and the signal voltage on lead 18 is also 0 volts. Since the input voltage to comparator 11 on lead 18 at point *a* is 0 volts and is less than the voltage in the input wave 30, comparator 11 will permit the sampler 13 to provide a positive output pulse which, in turn, gates the positive quantum of 0.1 volts into integrator 15. Since the previous comparator input voltage on lead 18, as noted in FIG. 4, was at the bias level, or 0.0 volt absolute magnitude, waveform 42 on lead 18 now rises by 0.1 volt from the 0 level at *a* to the 0.1 volt level. Since no decay occurs between successive sampling pulses, this 0.1 volt level will still be present upon the occurrence of the next sampling pulse, i.e., at point *b*. Point *b* on the output pattern 42 at lead 18 is also below the input wave 30 so that another positive quantum of 0.1 volt will be added to the charge on integrator 15 for a total charge of 0.2 volt.

Now the departure from the prior art becomes evident. Rather than simply taking another quantum step, output pattern 42 applied to comparator 11 is the absolute magnitude of the charge on the integrator, viz, 0.2 volt with the positive sign of the current sampler output. Thus pattern 42 rises to the 0.3 volt level and maintains this level until the next sampling pulse is applied at point *c*. This is so because the capacitance at the output of the signal forming circuitry is sufficient to maintain the 0.3 volt level or that a store is included in signal forming circuitry 17 to maintain the 0.3 volt level. Now pattern 42 is above input wave 30 so that sampler 13 will now permit the application of a negative quantum voltage of −0.1 volt to integrator 15. The absolute magnitude of the charge on integrator 15 thus is reduced to 0.1 volt, and it is this 0.1 volt value with the negative sign of the applied quantum that is applied to the lead 18 input to comparator 11. In FIG. 4 this − 0.1 volt value will bring the pattern 42 on lead 18 down to the 0.2 volt level at point *d*, the time of receipt of the next sampling pulse. Thus the absolute magnitude and direction of the integrator output is able to vary over a wide range in order to accommodate itself to the steep slope of the input wave; e.g., note the successive increases in levels on curve 42 from point *d* to the peak of input wave 30.

Considering now the situation on the shallow portion of the curve, at point *f*, with the integrator output voltage less than the voltage in the input wave at that time, the comparator will permit the sampler to provide a positive output pulse which, in turn, gates a positive quantum level into integrator 15. Since the previous integrator voltage was 0.0 volt, the signal on the integrating capacitor at point *f* will be 0.1 volt (excluding the established bias level). Therefore, the output of circuitry 17 applied to the comparator rises from point *f* by 0.1 volt to point *g*. Since no decay occurs, the same level will be present at point *h* when the next signal sample is received. Since point *h* is above the instantaneous amplitude of the input wave, the comparator will permit the sampler to provide a negative output pulse, and the integrator will receive a negative quantum of 0.1 volt. This serves to again reduce the absolute magnitude of the charge on the integrating capacitor to 0, and no change occurs in the signal forming circuit output voltage 42. Thus point *j*, at the outset of the next sampling interval, will also be above the input wave and the integrator will receive another negative quantum, −0.1 volt, which results in an output change on waveform 42 of that same amount.

The integrator now receives another positive quantum of 0.1 volt, which results in magnitude change of 0 volts at point *k* of waveform 42. The resultant is an extremely faithful tracking of the input wave by the signal forming circuitry 17 output pattern regardless of the signal amplitude.

Figure 5:
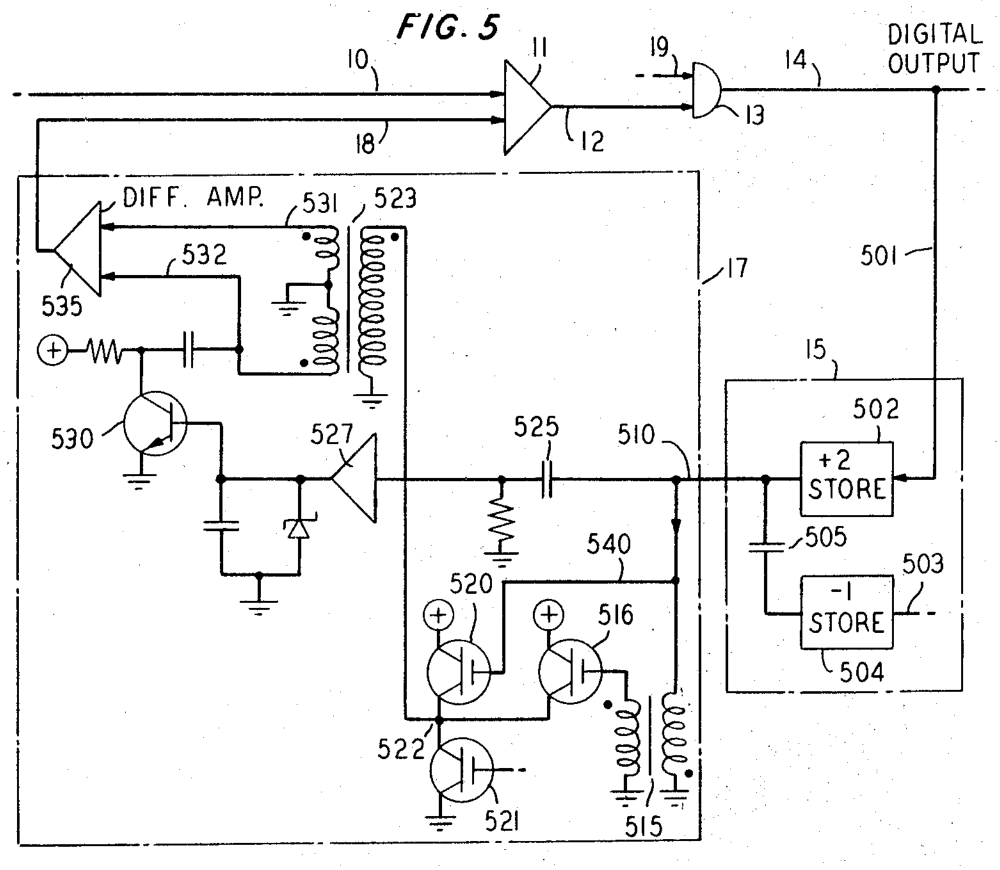
FIG. 5 depicts in greater detail the illustrative embodiment of the system depicted in FIG. 1.

A particular manner of implementing the illustrative embodiment is depicted in FIG. 5. As noted therein the input signal is received by comparator 11, via lead 10, where it is compared with the output of a circuit including integrator 15 and signal forming circuitry 17. Comparator 11, which may comprise a differential amplifier as known in the art, transmits a signal representing the difference between the input signal and the weighted integrator output signal to sampler 13 via lead 12. A clock pulse on lead 19 enables sampler 13, which may comprise a logic coincidence gate known in the art as an AND gate, to provide the corresponding digital output signal "1" or "0."

A "1" signal on leads 14 and 501, together with a clock pulse on lead 503 synchronized with the clock pulse on lead 19, enables charge stores 502 and 504 of integrator 15 in such a manner as to increase the charge of integrating capacitor 505 by one unit. A "0" signal will fail to enable store 502 so that only the clock enabled store 504 will affect the charge on integrating capacitor 505; viz., one unit of charge will be subtracted therefrom. This integrator arrangement, termed the "-bucket and dipper," is familiar to the art, and results in the requisite addition or subtraction of charge necessary for this single stage of integration. Other known integration circuits may, of course, be utilized.

The charge on integrating capacitor 505 is available on lead 510 to signal forming circuitry 17 where the novel aspects of this illustrative embodiment now become evident. Thus rather than simply transmitting the integrator output directly to comparator 11, as in the prior art, where it will simply reflect the change in charge on the integrating capacitor produced by each sampler output signal, the absolute magnitude of the charge is first derived and, coupled with the sign of the sampler output signal, is transmitted to comparator 11. The absolute magnitude of the charge is obtained through application of the integrator output signal to inverting transformer 515 and the forming of a single polarity signal from said integrating means output. The integrator output signal on lead 510 is also applied to the base of transistor 520. The output of transistor 516 tends to turn on transistor 520 when the integrator output on lead 540 tends to turn off transistor 520, and vice versa. This action results in the formation of a voltage divider between transistors 520 and 521 or between transistors 516 and 521 depending upon the sign of the integrator output on lead 510. Thus on each positive excursion of the integrator output signal the resistance of transistor 520 will decrease while the resistance of transistor 516 increases and vice versa. The potential applied to the base of transistor 521 serves to set the operating point at one-half the bias on the integrating capacitor 505. Thus the voltage at point 522 represents the instantaneous absolute magnitude of the charge on integrating capacitor 505.

Advantageously field effect transistors, as known in the art and illustrated in FIG. 5, serve as the absolute magnitude and voltage divider elements. These are unipolar devices having the control potential applied to the gate (base) to develop a voltage variation between the source (emitter) and drain (collector) as the internal resistance is modulated by the field. Advantageously the three devices are fabricated on a single substrate and positioned close together so that a temperature change on the substrate may change current levels through the devices but will not change the voltage division ratio. Thus a temperature differential between transmitter and receiver could not produce distortion.

In order to determine the sign for the absolute magnitude signal applied to the primary side of transformer 523, the secondary winding is arranged to provide the same signal on lead 531 and twice its complement on lead 532. The integrator output on lead 510 is applied to the base of transistor 530 via capacitor 525 and high gain amplifier 527. A negative pulse will maintain transistor 530 in its nonconductive state so that the signal on lead 531 will be subtracted from the signal on lead 532 in difference amplifier 535 to produce the absolute magnitude signal with negative polarity on lead 18. Similarly a positive pulse on lead 510 will render transistor 530 conductive, thereby shunting the signal on lead 532 through transistor 530 to ground. Thus, in this instance, the signal on lead 531 is compared with a 0 signal on lead 532 in difference amplifier 535 thereby producing the absolute magnitude signal with positive polarity on lead 18.

Figure 6:
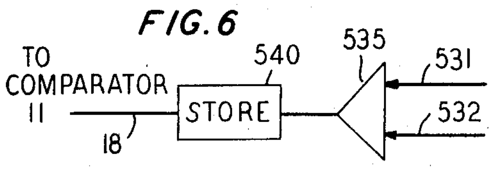
FIG. 6 depicts modifications to the transmitter in accordance with the illustrative embodiment of this invention.

It should be noted in FIG. 5 that the capacitance at the output of differential amplifier 535 is sufficient to maintain the signal on lead 18 constant between sampling pulses as shown on waveform 42 of FIG. 4. The arrangement shown in FIG. 6 may be used where the output capacitance of amplifier 535 is not sufficient. FIG. 6 shows differential amplifier 535 and an analog store 540 connected between the output of amplifier 535 and lead 18. As is well known in the art, the store may comprise a parallel connected resistance-capacitance network or an operational amplifier arranged to provide the store function. Store 540 is operative to maintain the signal on lead 18 constant between samplings. Only a change in the output of amplifier 535 is effective to alter the reference level of store 540.

It is to be understood that the above-described arrangements are illustrative of the application of the principles of the invention. Numerous other arrangements may be devised by those skilled in the art without departure from the spirit and scope of this invention.

What is claimed is:

1. In a delta modulation system, comparing means supplied with an input message waveform for producing differential signals, means for modulating a sequence of timing pulses with said differential signals to provide an output pulse sequence having first and second type pulses, means for producing a discrete signal corresponding to each one of said first and second type output pulses, integrating means supplied with said discrete signals, and means for applying the output of said integrating means to said comparing means, said applying means comprising means for generating the absolute magnitude of said integrating means output, means responsive to said discrete signal for indicating the type of said corresponding output pulse and means for combining the output of said generating means with the output of said indicating means.

2. In a delta modulation system, the combination in accordance with claim 1 wherein said applying means comprises means for detecting the type of output pulse supplied to said integrating means, means for generating a signal corresponding to the absolute magnitude of said integrating means output and means for combining the outputs of said detecting means and of said signal generating means.

3. In a delta modulation system the combination in accordance with claim 2 wherein said signal generating means comprises means for forming a single polarity signal from said integrating means output and a voltage divider for establishing the operating level of the forming means output consistent with the operating level of said integrating means.

4. In a delta modulation system the combination in accordance with claim 3 wherein said voltage divider comprises first and second field effect transistors, means for applying the integrating means output to said first transistor and means for applying a bias voltage to said second transistor.

5. In a delta modulation system, means comprising comparing means supplied with input signals for producing a sequence of distinct types of output pulses, integrating means supplied with said sequence of output pulses first means for generating a signal equal in magnitude to the content of said integrating means and which is irrespective of the sign of said content, second means for generating a signal indicative of the sign of the content of said integrating means, and means for applying both of said signals to said comparing means.

6. In a delta modulation system the combination in accordance with claim 5 further comprising means at a receiving station for reconstructing a replica of the original input signals from the output pulse sequence transmitted from said pulse producing means.

7. In a delta modulation system according to claim 5 further comprising means connected between said signal applying means and said comparing means for storing said signal corresponding to the signal from said first and second generating means.

8. A closed loop circuit having input terminal means supplied with a message wave and output terminal means for supplying receiving means with a delta modulated signal comprising comparison means supplied from said input terminal means for providing a differential signal, means for sampling said differential signal during a distinct time interval to provide a delta modulated signal to said output terminal means, integrating means, means enabled by said delta modulated signal for supplying a discrete quantity of charge to said integrating means and means for applying the resultant integral to said comparison means for comparison with said message wave, characterized in that said resultant integral applying means comprises a circuit for generating a signal corresponding to the absolute magnitude of said resultant integral, a circuit for determining the sign of said delta modulated signal, means jointly responsive to the output of said sign determining means and the signal from said signal generating means for providing said absolute magnitude signal with said sign and means for coupling said signal providing means to said comparison means.

9. A closed loop according to claim 8 characterized in that said coupling means comprises storing means for maintaining the output of said signal providing means constant between said distinct time intervals.

* * * * *